(12) United States Patent
Dickson

(10) Patent No.: US 11,290,183 B2
(45) Date of Patent: Mar. 29, 2022

(54) FEED-FORWARD CONTROL OF FREE SPACE OPTICAL COMMUNICATION SYSTEM BASED ON INERTIAL MEASUREMENT UNIT

(71) Applicant: SA Photonics, Inc., Los Gatos, CA (US)

(72) Inventor: William C. Dickson, Granville, OH (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 16/856,994

(22) Filed: Apr. 23, 2020

(65) Prior Publication Data

US 2021/0250093 A1 Aug. 12, 2021

Related U.S. Application Data

(60) Provisional application No. 62/972,572, filed on Feb. 10, 2020.

(51) Int. Cl.
*H04B 10/11* (2013.01)
*H04B 10/114* (2013.01)
*H04L 1/00* (2006.01)

(52) U.S. Cl.
CPC ........ *H04B 10/1143* (2013.01); *H04L 1/0042* (2013.01)

(58) Field of Classification Search
CPC .............. H04B 10/112; H04B 10/1129; H04B 10/1149; H04B 10/118; H04B 10/1143; H01Q 1/288; H04L 1/0042
See application file for complete search history.

(56) References Cited

U.S. PATENT DOCUMENTS

| | | | | |
|---|---|---|---|---|
| 5,838,278 A * | 11/1998 | Tsujisawa | ................ | H01Q 1/18 342/377 |
| 6,538,602 B2 * | 3/2003 | Natsume | ................ | H01Q 1/125 342/359 |
| 7,663,542 B1 * | 2/2010 | Goodzeit | ............... | H01Q 1/288 342/359 |
| 8,174,705 B1 * | 5/2012 | Coward | ................ | G01D 5/266 356/510 |
| 8,371,505 B1 * | 2/2013 | Zolotov | ............ | G06K 7/10722 235/462.24 |
| 9,360,740 B2 * | 6/2016 | Wagner | ................ | G03B 17/561 |

(Continued)

*Primary Examiner* — Tanya T Motsinger
(74) *Attorney, Agent, or Firm* — Fenwick & West LLP

(57) ABSTRACT

Embodiments relate to a free space optical (FSO) communications system with a feed-forward control path. A data-encoded FSO beam is transmitted from a local terminal to a remote terminal. The local terminal directs a propagation direction of the FSO beam by a beam steering unit. To reduce pointing errors between the terminals, the FSO communications system includes a feed-forward control path. The control path includes an inertial measurement unit (IMU) that outputs motion data indicative of motion of the local terminal, for example if the local terminal is mounted to a tower that sways. The control path also includes a controller that receives the motion data from the IMU and generates feed-forward control signals for the beam steering unit. The control signals compensate for an effect of the motion of the local terminal on the propagation direction of the FSO beam.

19 Claims, 3 Drawing Sheets

(56) References Cited

U.S. PATENT DOCUMENTS

| | | | | |
|---|---|---|---|---|
| 9,571,192 | B2* | 2/2017 | Chalfant, III | H04B 10/112 |
| 9,716,549 | B2* | 7/2017 | Dickson | H04B 10/118 |
| 10,359,570 | B1* | 7/2019 | Belt | H04B 10/112 |
| 10,563,981 | B1* | 2/2020 | Li | G01C 19/00 |
| 10,674,312 | B2* | 6/2020 | Jiang | H04W 64/00 |
| 11,035,673 | B2* | 6/2021 | Faragher | G01C 21/165 |
| 11,042,078 | B2* | 6/2021 | Wagner | G03B 17/561 |
| 2004/0057730 | A1* | 3/2004 | Littlejohn | H04B 10/112 |
| | | | | 398/156 |
| 2004/0207727 | A1* | 10/2004 | von Flotow | G01C 11/025 |
| | | | | 348/143 |
| 2005/0100339 | A1* | 5/2005 | Tegge | H04B 10/118 |
| | | | | 398/125 |
| 2012/0308235 | A1* | 12/2012 | Pusarla | H04B 10/1121 |
| | | | | 398/79 |
| 2013/0016584 | A1* | 1/2013 | Zhou | G01S 15/8902 |
| | | | | 367/88 |
| 2014/0086191 | A1* | 3/2014 | Berntsen | H04L 5/0058 |
| | | | | 370/329 |
| 2014/0150100 | A1* | 5/2014 | Gupta | G06F 21/316 |
| | | | | 726/22 |
| 2014/0248049 | A1* | 9/2014 | Saint Georges | H04B 10/1125 |
| | | | | 398/25 |
| 2017/0064515 | A1* | 3/2017 | Heikkila | H04W 4/021 |
| 2017/0280211 | A1* | 9/2017 | Damaghi | H04J 14/04 |
| 2017/0324248 | A1* | 11/2017 | Oakes | H02J 3/14 |
| 2018/0026644 | A1* | 1/2018 | Shankar | G06F 1/3296 |
| | | | | 326/41 |
| 2018/0041895 | A1* | 2/2018 | Barcala | H04W 4/12 |
| 2018/0219784 | A1* | 8/2018 | Jiang | H04L 12/14 |
| 2020/0136582 | A1* | 4/2020 | Milroy | H03H 7/21 |
| 2020/0280829 | A1* | 9/2020 | Benefield | H04B 10/1143 |

* cited by examiner

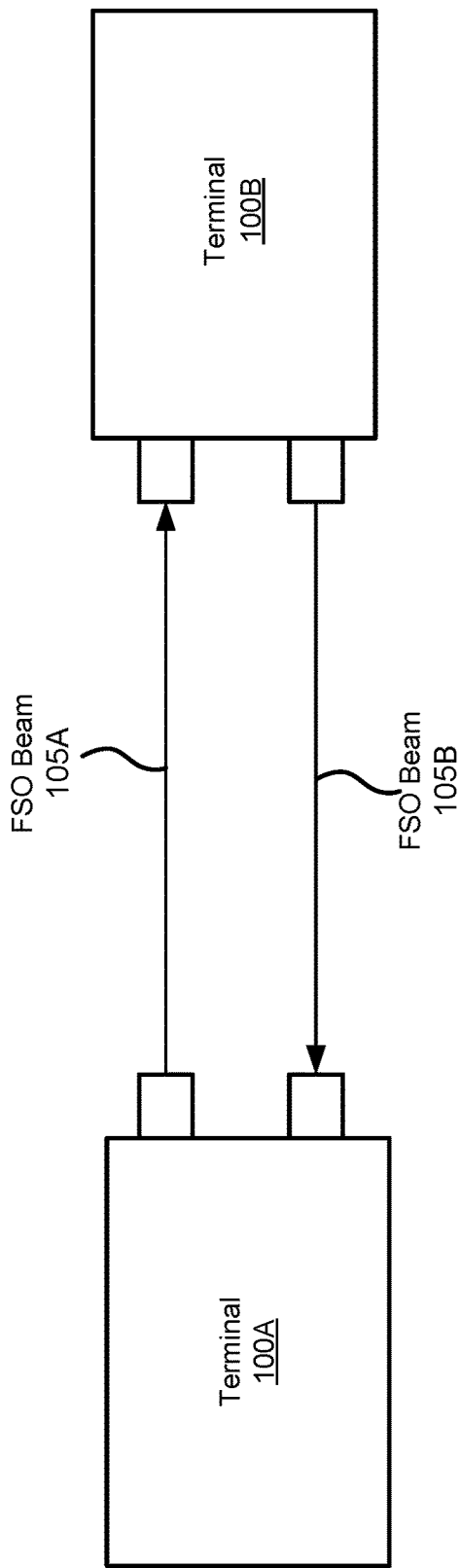
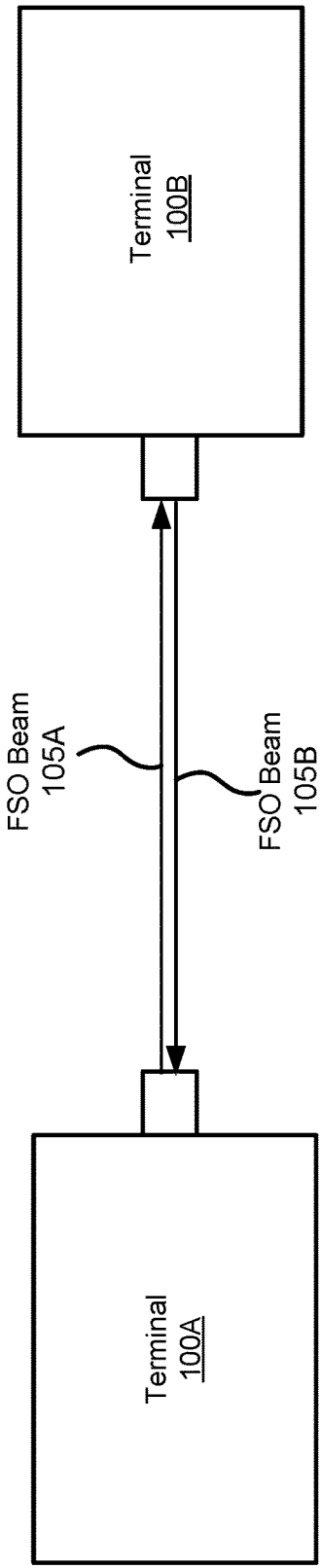
FIG. 1A
FIG. 1B

FEED-FORWARD CONTROL OF FREE SPACE OPTICAL COMMUNICATION SYSTEM BASED ON INERTIAL MEASUREMENT UNIT

CROSS-REFERENCE TO RELATED APPLICATION

This application claims priority under 35 U.S.C. § 119(e) to U.S. Provisional Patent Application Ser. No. 62/972,572, "Feed-Forward Control of Free Space Optical Communication System Based on Inertial Measurement Unit," filed on Feb. 10, 2020, the content of which is incorporated herein by reference in its entirety.

BACKGROUND

1. Technical Field

This disclosure relates generally to free space optical (FSO) communications and, more particularly, to reducing alignment errors due to movement of an FSO terminal.

2. Description of Related Art

Free space optical (FSO) communications is a communications technology that uses light propagating in free space to wirelessly transmit data, for example, for telecommunications or computer networking. Free space is a communications medium that can include water, air, outer space, or vacuum and contrasts with guided wave communications, such as optical fibers. FSO technology is useful where physical connections are impractical due to high costs or other considerations. In contrast with other electromagnetic communications means, FSO signals are more directional. This confers benefits both for communications capacity and for communications privacy.

The high directionality of FSO signals, however, requires more accurate pointing alignment between systems to maintain the benefit of the directionality. When FSO communications terminals operate in unpredictable or rapidly changing conditions, additional measures are required to maintain the alignment. For example, if an FSO node is mounted on a tower, strong winds may cause the tower and FSO terminal to sway. In another example, an FSO terminal is mounted on a vehicle that communicates with a stationary FSO terminal. In these and similar situations, the high directionality of FSO technology may require rapid adjustment and accurate pointing to maintain a viable FSO communications link.

SUMMARY

To reduce or eliminate motion related misalignments, embodiments of the present disclosure relate to an FSO communications system that includes an FSO communications terminal and a feed-forward control path. The FSO communications terminal includes a beam steering unit that adjusts a transmit propagation direction (also referred to as the Tx direction) of a data-encoded optical beam towards a remote FSO communications terminal. The feed-forward control path includes an inertial measurement unit (IMU) and a controller. The IMU itself may be placed within the FSO terminal, or on a supporting structure, or it may remotely sense terminal movement. The controller receives the motion data from the IMU and generates and provides feed-forward control signals to the beam steering unit. The feed-forward control signals compensate for effects of the motion of the FSO communications terminal on the propagation direction of the data-encoded optical beam, and thus reduce disruptions in communications between terminals.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A and 1B are block diagrams of two terminals communicating via FSO communications links, according to some embodiments.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIGS. 1A and 1B are block diagrams of terminals 100A and 100B communicating via free space optical (FSO) communications links, according to some embodiments. Specifically, the terminals 100 are communicating by transmitting and receiving data-encoded FSO beams 105. In FIG. 1A, each terminal 100 receives and transmits FSO beams 105 through different apertures, while in FIG. 1B, the terminals are co-boresighted so that beams are received and transmitted though the same aperture. As described herein, if terminal 100A is used as the frame of reference, terminal 100B may be referred to as a remote terminal, beam 105A may be referred to as a transmit (Tx) beam, and beam 105B may be referred to as a receive (Rx) beam.

Figure 2:
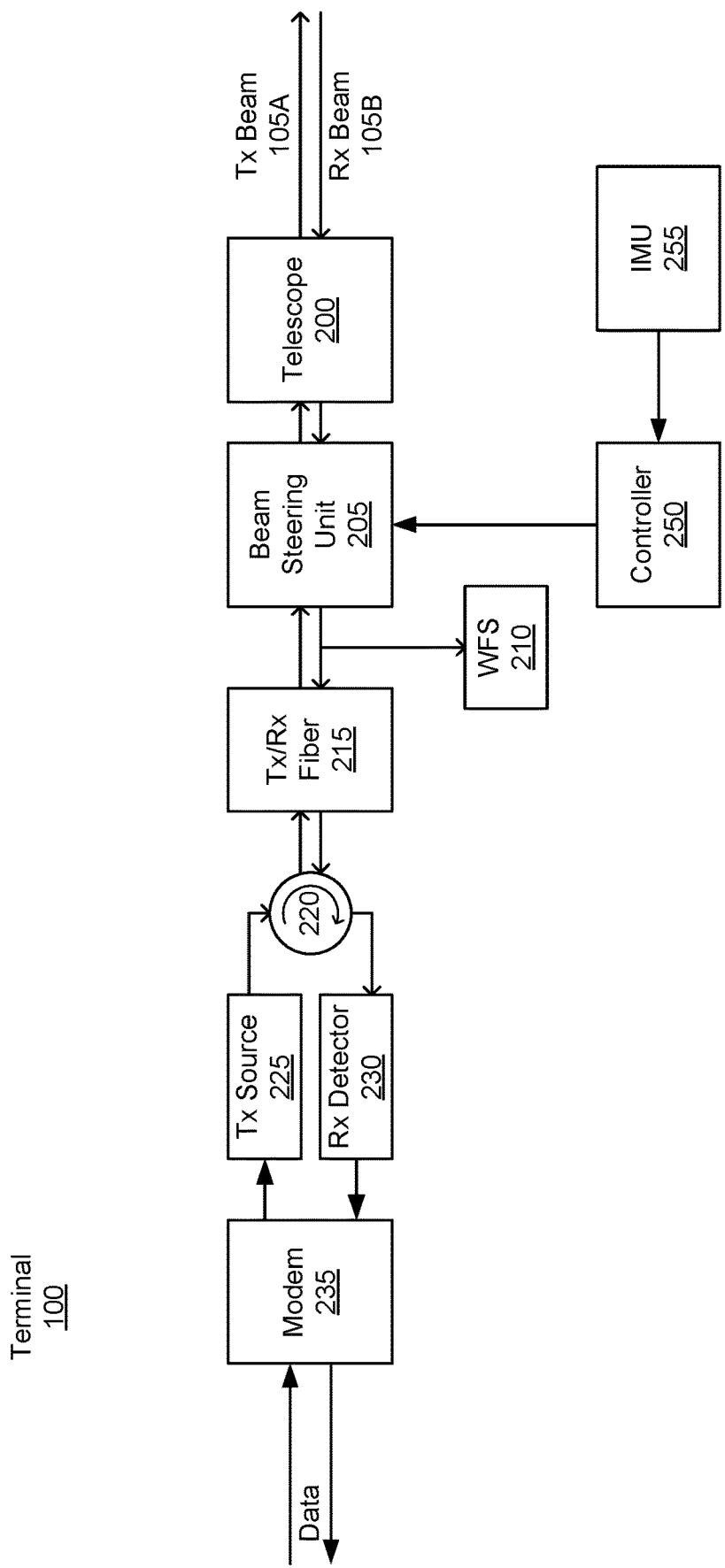
FIG. 2 is a block diagram of a single terminal, according to an embodiment.

FIG. 2 is a block diagram of a single terminal 100, according to an embodiment. The terminal 100 includes a data I/O interface (not shown), modem 235, Tx source 225, Rx detector 230, a circulator 220, a Tx/Rx fiber 215, a wavefront sensor (WFS) 210, a beam steering unit 205, and a telescope 200. In this example, the terminal 100 also includes an inertial measurement unit (IMU) 255 and a controller 250, although these may be outside the terminal 100 in other implementations. In FIG. 2, electrical signals (both analog and digital) are indicated by the solid arrows and optical signals (both guided and free space) are indicated by the line arrows.

The components are optically coupled as follows. The telescope 200 is optically coupled to the beam steering unit 205. The beam steering unit 205 is optically coupled to the wavefront sensor 210. It is also optically coupled to the circulator 220 via the fiber 215. The ports of the optical circulator 220 are optically coupled to the Tx source 225, the Tx/Rx fiber 215 and the Rx detector 230. The components are electrically coupled as follows. The IMU 255 is electrically coupled to the controller 250, and the controller 250 is electrically coupled to the beam steering unit 205. The modem 235 is electrically coupled to the Tx source 225 and the Rx detector 230.

The terminal 100 includes at least two optical paths: an Rx beam path and a Tx beam path. In the Rx beam path, a Rx beam 105B propagates through the telescope 200 and is directed towards the beam steering unit 205. The beam steering unit 205 steers the Rx beam to the wavefront sensor 210 and fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the beam steering unit 205. The Tx beam is directed by the beam steering unit (BSU) 205 towards the telescope 200. The Tx beam 105A propagates through the telescope 200 and into free space.

The telescope 200 and beam steering unit 205 are optical components that direct Rx beams 105B to the wavefront sensor 210 and fiber 215, and direct Tx beams 105A to the remote terminal. The telescope 200 includes components that can spread, focus, redirect, and otherwise modify the beams 105 passing through it. The position of the telescope 200 relative to the terminal 100 is typically fixed. The telescope 200 may be as simple as a single lens or it may include additional optical components, such as diffusers, phase screens, beam expanders, mirrors, and lenses.

The beam steering unit 205 may be a fast steering mirror, a pair of rotatable prisms, or a mechanism that re-orients the entire terminal. In some embodiments, it may be advantageous to place the beam steering unit between the telescope 200 and the two Beams 105A and 105B, rather than the more commonly selected placement shown in FIG. 2, where it is between Tx/Rx Fiber 215 and telescope 200. In all configurations, the WFS 210 is located to the immediate left (in the scheme of FIG. 2) of BSU 205, where it samples a portion of the signal from the Rx optical path. The beam steering unit 205 may operate in different modes, such as a beam acquisition mode or a beam tracking mode. For example, an initial Tx direction (also referred to as propagation direction) is established through a beam acquisition mode. The Tx direction may be periodically or continuously updated in a beam tracking mode. In some cases, the Tx beam 105A is transmitted along the same direction that the Rx beam 105B is received (the Rx beam's 105B direction of propagation may be determined from the wavefront sensor 210). In some cases, the Tx direction is not parallel to the Rx direction. For example, atmospheric disturbances closer to one of the terminals 100 can affects that terminal's transmit beam more strongly and result in different optimal beam-travel directions for the two optical paths between terminals 100. In another example, if a remote terminal is moving, the beam steering unit 205 may direct a Tx beam with an angular bias (referred to as point-ahead bias). This may be desirable when there is delay between beam emission from the Tx terminal and sensing by the WFS at the receiver. The delay may accumulate from electronic processing time or optical propagation time between the terminals. While steering Tx beams in a Tx direction towards a remote terminal, the beam steering unit 205 may dither the Tx direction in order to maintain alignment of the Tx beam with the remote terminal. For example, see patent application Ser. No. 16/856,953 filed on Apr. 23, 2020 and incorporated herein by reference in its entirety.

Figure 3:
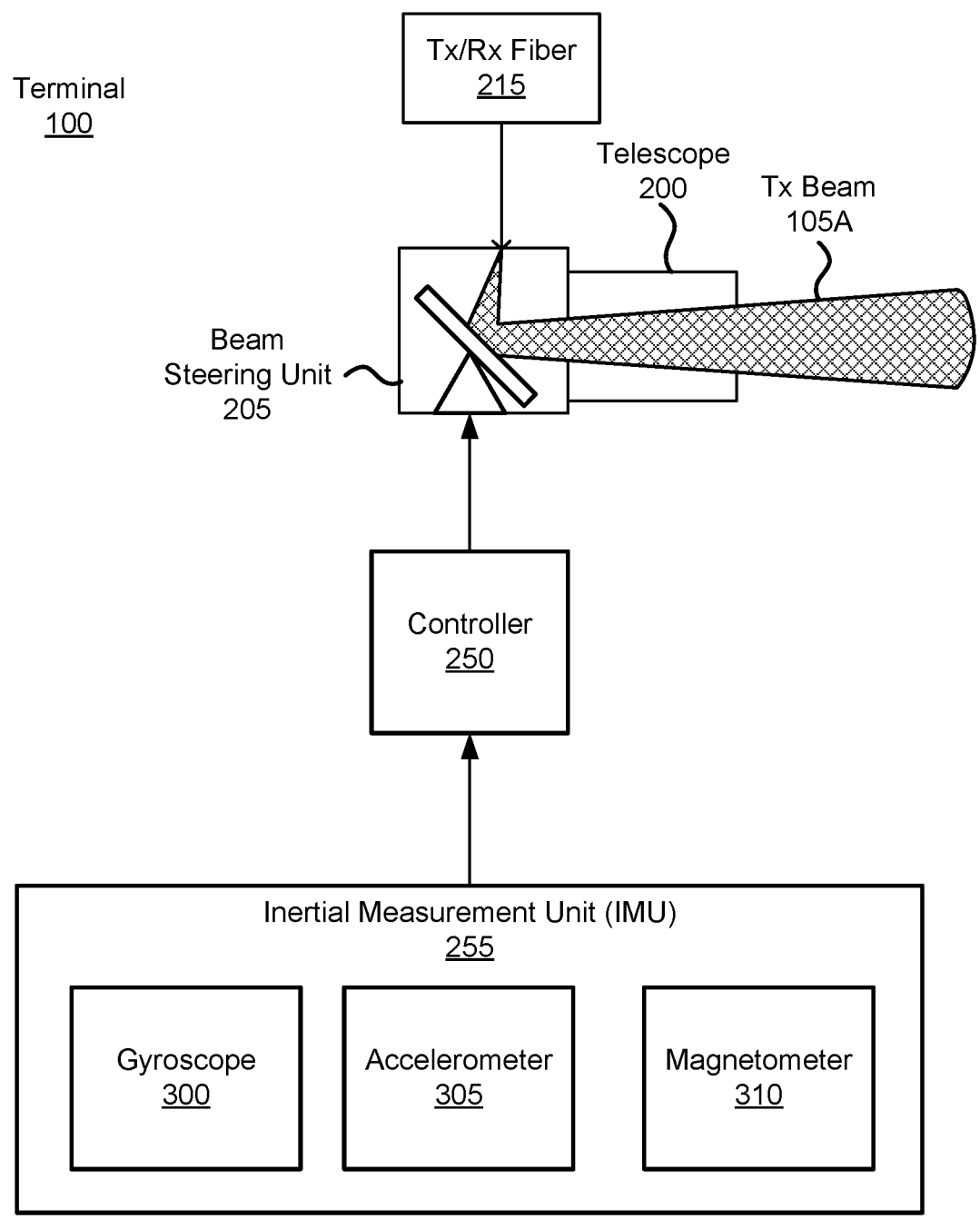
FIG. 3 is a diagram showing detail of the feed-forward control path, according to an embodiment.

The IMU 255 and controller 250 are also used to maintain alignment of the Tx beam with the remote terminal. They are described below with reference to FIGS. 2 and 3. The IMU 255 is an electronic device that measures and outputs motion data indicative of motion of the terminal 100. The IMU 255 can measure angular rotational and translational motion of the terminal 100. Rotational motion may be determined by one or more gyroscopes 300 and translational motion may be determined by one or more accelerometers 305. In some embodiments, the IMU 255 includes one or more magnetometers 310 to determine the orientation or change in orientation of the terminal 100. While the IMU 255 is illustrated as being mounted in the terminal 100, the IMU 255 can be mounted outside the terminal 100. If so, it is desirable for the IMU 255 to be near the terminal 100 so that the IMU 255 experiences motion similar to the terminal 100.

The motion data generated by the IMU 255 may be sampled digital data or an analog signal, and the controller 250 may be a digital controller or an analog controller. The motion data can indicate motion along one or more orthogonal axes (e.g., three translational and three rotational axes). In embodiments where the terminal is mounted to a stationary but flexible structure (e.g., a tower, building, or pole), the motion data may only indicate motion along two axes (height of the terminal being assumed constant in this case). In some embodiments, the IMU 255 includes absolute position sensors that dynamically measure range between the terminal and particular nearby fixed structures. In embodiments where the terminal is mounted to a vehicle (e.g., a car, boat, or plane), the motion data can be indicative of motion of the vehicle and the motion data may indicate motion along three or more axes.

The controller 250 controls the beam steering unit 205 via control signals, indicated by the solid-head arrow. In some embodiments, the controller is a stateless controller. The controller 250 may update the Tx direction based on motion data from the IMU 255. Specifically, the controller 250 receives motion data from the IMU 255, estimates motion of the terminal 100 based on the motion data, determines control signals, and transmits the control signals to the beam steering unit 205 to adjust the Tx direction. In some cases, updated Tx directions based on motion data are on the order of milliradians. Thus, the IMU 255 and controller 250 can reduce pointing misalignments that occur due to the motion of the terminal 100. For example, if the terminal 100 is mounted to an object that sways, the controller 250 determines control signals that compensate for the swaying motion of the terminal 100. In some cases, the controller 250 determines motion patterns from the motion data (e.g., after receiving a threshold amount of motion data). If the terminal 100 is swaying, the controller may fit the IMU data to a parameterized motion model. For example, a sinusoidal-motion model may use IMU data to estimate amplitudes and frequencies on multiple axes. This allows the controller to extract the terminal's position by applying these estimated parameters. The controller 250 can be an analog or digital controller. As the name suggests, a digital controller digitizes the motion data and digitally determines the control signals. Digital controllers may determine control signals to compensate for terminal motion based on current data from the IMU sensors and from past data samples from the IMU sensors. The IMU 255 may include cameras (not illustrated) that view its surroundings; in this case the motion is extracted by tracking scene features from frame to frame.

As suggested above, the IMU 255 and controller 250 form a feed-forward control path (also referred to as an open-loop control path) because the control applied to the beam steering unit 205 does not affect subsequent measurements made by the IMU 255. A functioning feed-forward control system relies on fast and accurate IMU measurements plus a faithful mathematical transformation between the measurements and beam-pointing optimality. Many practical FSO applications do not meet one or both of these requirements. In some embodiments, additional inputs beyond those available through an IMU are provided to the controller 250 to compensate for terminal motion. These inputs may include WFS 210 measures of the spatial beam distribution. When the WFS 210 output is part of the control system, the system may be referred to as a mixed feed-forward and feed-back loop, because control applied to the beam steering unit 205 affects subsequent measures of beam distribution made by the WFS 210.

For example, a controller 250 might compensate for wind-driven tower swaying by continually applying a scaled offset to beam steering unit 205 in the opposite direction. To be effective over a wide variety of weather and wind load conditions, the offset may be applied at least on the order of 100 times per second. More complex software could be incorporated into the controller 250 that integrates inputs from multiple sensors to apply an optimal offset. A low-cost digital signal processor (DSP) or even a general-purpose microcontroller unut (MCU) so incorporated would be sufficiently capable for such multiple-input, software-managed control. In some cases, for example when a single mechanical vibration mode dominates motion in the terminal 100, an even lower sample and control rate could result in effective motion compensation.

In some embodiments, as described above, the terminal 100 also includes one or more feed-back control paths. For example, in response to receiving the Tx beam 105A, the remote terminal provides feed-back control signals to the local terminal (e.g., in the form of a Rx beam 105B). The control signals may be decoded by the modem and transmitted to the controller (not illustrated). In some cases, the remote terminal provides signals that indicate the strength (e.g., power) of the Tx beam 105A received by the remote terminal. Since beam strength typically has a Gaussian radial distribution, the controller 250 can recover Tx direction errors from only the measured strength of the Tx beam 105A. Thus, based on the signals from the remote terminal, the controller 250 may adjust the Tx direction of the Tx beam 105A. Additionally or alternatively, signals from the remote terminal may include motion data from an IMU 255 for the remote terminal. This allows the local terminal to determine motion of the remote terminal and adjust the Tx direction accordingly.

In embodiments where the terminal includes both feed-forward and feed-back control paths, the controller 250 may determine control signals based on both the motion data and feed-back signals (an example feed-back signal is the spatial power distribution of the received beam sensed through a device such as the wavefront sensor 210). The motion data and feed-back signals may be weighted differently depending on their availability and accuracy. In some embodiments, the bandwidth of the feed-forward control path is at least twice the feed-back control path bandwidth.

Referring to FIG. 2, the wavefront sensor 210 is a component that detects and measures incident light. The wavefront sensor 210 includes detectors to determine the position of an incident Rx beam 105B. For example, the wavefront sensor 210 may be a quad-cell (or another multi-cell) sensor. Since the position of the Rx beam 105B on the wavefront sensor 210 can indicate the Rx direction (and thus alignment errors between the terminals), detector signals indicative of position information may be sent to the controller 250. The detectors of the wavefront sensor 210 can be photodetectors or other electromagnetic-wave detectors that convert the incoming electromagnetic waves into electrical current. The wavefront sensor 210 can include light detectors capable of detecting different types of light signals, e.g., low and high light intensities, specific wavelengths, etc. This allows the terminal 100 to operate in low light (e.g., at night) and high light situations (e.g., at mid-day). The wavefront sensor 210 may include a hole filled by an end of the fiber 215. This can allow light directed to the wavefront sensor 210 to be coupled into the fiber 215. In another example, the wavefront sensor 210 includes a fiber bundle connected to detectors. These example wavefront sensors 210 and fiber combinations 215 are described in U.S. Pat. No. 10,389,442 "Free Space Optical (FSO) System" and U.S. Pat. No. 10,411,797 "Free Space Optical Node with Fiber Bundle" which are incorporated herein by reference in their entirety.

The Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate through the inner cladding. The circulator 220 can be a single-mode or multi-mode circulator. Example circulators are described in patent application Ser. No. 16/259,899 "Optical Circulator with Double-Clad Fiber" which is incorporated herein by reference in its entirety. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The modem 235 modulates data to be transmitted in Tx beams. Specifically, the modem 235 converts incoming data from the I/O interface (not shown) into a modulated electrical signal. The modulated signal is sent to the Tx source 225 and converted into a Tx beam. The modem can also demodulate data encoded in Rx beams. Specifically, the modem 235 decodes information in the electrical signals from the Rx detector 230. The decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

Although the detailed description contains many specifics, these should not be construed as limiting the scope of the invention but merely as illustrating different examples. It should be appreciated that the scope of the disclosure includes other embodiments not discussed in detail above. For example, other configurations to measure terminal position or orientation, or other configurations that incorporate measurements of the received beam power distribution in various combinations. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

What is claimed is:

1. A free space optical (FSO) communications system comprising:
   an FSO communications terminal comprising a beam steering unit that adjusts a propagation direction of a data-encoded optical beam towards a remote FSO communications terminal; and
   a feed-forward control path comprising:
      an inertial measurement unit (IMU) that outputs motion data that is indicative of motion of the FSO communications terminal; and
      a controller that receives the motion data from the IMU and generates and provides feed-forward control signals to the beam steering unit, wherein the feed-forward control signals compensate for an effect of the motion of the FSO communications terminal on the propagation direction of the data-encoded optical beam,
      wherein, responsive to the controller receiving a threshold amount of motion data, the controller generates the feed-forward control signals by fitting the threshold amount of motion data to a motion model.

2. The FSO communications system of claim 1, wherein the IMU measures rotation of the FSO communications terminal about two axes.

3. The FSO communications system of claim 1, wherein the IMU measures translation of the FSO communications terminal along two dimensions.

4. The FSO communications system of claim 1, wherein the IMU comprises one or more cameras and a processor that determines motion data based on video data from the one or more cameras.

5. The FSO communications system of claim 1, wherein the IMU comprises two gyroscopes and/or accelerometers and/or cameras that measure rates and/or accelerations and/or displacement angles along two dimensions.

6. The FSO communications system of claim 1, wherein the controller is a digital controller.

7. The FSO communications system of claim 1, wherein the controller is an analog controller.

8. The FSO communications system of claim 1, wherein the controller is a stateless controller.

9. The FSO communications system of claim 1, wherein the motion model is a parameterized motion model.

10. The FSO communications system of claim 1, wherein the controller is an analog circuit or analog computer.

11. The FSO communications system of claim 1, further comprising:
    a feed-back control path from the remote FSO communications terminal to the beam steering unit, the feed-back control path providing feed-back control signals to the beam steering unit based on a strength of the data-encoded optical beam received at the remote FSO communications terminal, wherein the motion data and the feed-back control signals are weighted based on availability and accuracy.

12. The FSO communications system of claim 1, wherein the FSO communications terminal receives a data-encoded optical beam from the remote FSO communications terminal, the received data-encoded optical beam encoding motion data from an IMU of the remote FSO communications terminal; and the controller further generates and provides control signals to the beam steering unit based on the motion data encoded in the received optical beam.

13. The FSO communications system of claim 1, wherein the beam steering unit includes a steering mirror.

14. The FSO communications system of claim 1, wherein the FSO communications terminal and the IMU are mounted to a stationary but flexible object and the motion data is indicative of swaying of the object.

15. The FSO communications system of claim 1, wherein the FSO communications terminal and the IMU are mounted to a vehicle and the motion data is indicative of movement of the vehicle.

16. The FSO communications system of claim 1, wherein the IMU is mounted outside the FSO communications terminal.

17. The FSO communications system of claim 1, wherein the IMU is mounted inside the FSO communications terminal.

18. The FSO communications system of claim 1, wherein a controller generates and provides feed-forward control signals to the beam steering unit at least 100 times per second.

19. A free space optical (FSO) communications system comprising:
    an FSO communications terminal comprising a beam steering unit that adjusts a propagation direction of a data-encoded optical beam towards a remote FSO communications terminal;
    a feed-forward control path comprising:
       an inertial measurement unit (IMU) that outputs motion data that is indicative of motion of the FSO communications terminal; and
       a controller that receives the motion data from the IMU and generates and provides feed-forward control signals to the beam steering unit, wherein the feed-forward control signals compensate for an effect of the motion of the FSO communications terminal on the propagation direction of the data-encoded optical beam, and
    a feed-back control path from the remote FSO communications terminal to the beam steering unit, the feed-back control path providing feed-back control signals to the beam steering unit based on a strength of the data-encoded optical beam received at the remote FSO communications terminal, wherein a bandwidth of the feed-forward control path is at least twice a bandwidth of the feed-back control path.

* * * * *